(12) United States Patent
Cain

(10) Patent No.: US 11,347,101 B2
(45) Date of Patent: May 31, 2022

(54) DEVICE COMPRISING A STACK OF INDIVIDUAL LIQUID CRYSTAL CELLS HAVING ELECTRICAL CIRCUITRY OPERABLE TO GENERATE A STACK OF REFRACTIVE INDEX PATTERNS AND METHOD OF PRODUCING THE SAME

(71) Applicant: Flexenable Limited, Cambridge (GB)

(72) Inventor: Paul Cain, Cambridge (GB)

(73) Assignee: Flexenable Limited, Cambridge (GB)

( * ) Notice: Subject to any disclaimer, the term of this patent is extended or adjusted under 35 U.S.C. 154(b) by 0 days.

(21) Appl. No.: 16/906,234

(22) Filed: Jun. 19, 2020

(65) Prior Publication Data
US 2020/0409195 A1    Dec. 31, 2020

(30) Foreign Application Priority Data

Jun. 26, 2019   (GB) .................................... 1909161

(51) Int. Cl.
| | | |
|---|---|---|
| *G02F 1/1335* | (2006.01) | |
| *G02F 1/133* | (2006.01) | |
| *G02F 1/1343* | (2006.01) | |
| *G02F 1/1347* | (2006.01) | |

(Continued)

(52) U.S. Cl.
CPC ...... *G02F 1/133526* (2013.01); *G02F 1/1347* (2013.01); *G02F 1/13306* (2013.01); *G02F 1/134309* (2013.01); *G02F 1/294* (2021.01); *G02F 1/137* (2013.01)

(58) Field of Classification Search
CPC . G02F 1/13471; G02F 1/294; G02F 1/133526
See application file for complete search history.

(56) References Cited

U.S. PATENT DOCUMENTS

| | | | |
|---|---|---|---|
| 7,312,917 B2* | 12/2007 | Jacob ........................ | G02F 1/29 |
| | | | 359/319 |
| 2011/0090451 A1 | 4/2011 | Chang et al. | |

(Continued)

FOREIGN PATENT DOCUMENTS

| | | | | | |
|---|---|---|---|---|---|
| CN | 101968595 A | * | 2/2011 | ............. | G02B 30/25 |
| CN | 102854694 A | * | 1/2013 | ............... | G02F 1/29 |
| JP | 62077794 A | * | 4/1987 | ........... | H04N 13/305 |

(Continued)

OTHER PUBLICATIONS

Search Report from Great Britain Patent Application No. 1909161.0, dated Dec. 13, 2019.

*Primary Examiner* — Paul C Lee
(74) *Attorney, Agent, or Firm* — Dergosits & Noah LLP; Todd A. Noah

(57) ABSTRACT

A technique, comprising: producing at least first and second individual liquid crystal cells, wherein the first and second individual liquid crystal cells each comprise liquid crystal material between a respective pair of support components, and electrical circuitry operable to generate a refractive index pattern in the liquid crystal material; the method comprising adhering together at least the first and second liquid crystal cells to form a stack of liquid crystal cells; wherein the electrical circuitry of the first and second liquid crystal cells is operable together to generate a stack of refractive index patterns in the liquid crystal material of the stack of liquid crystal cells.

19 Claims, 9 Drawing Sheets

(51) Int. Cl.
  *G02F 1/29* (2006.01)
  *G02F 1/137* (2006.01)

(56) References Cited

U.S. PATENT DOCUMENTS

2014/0368488 A1* 12/2014 Hatsu .................. G09G 3/3648
                                                    345/212
2017/0276928 A1*  9/2017 Sakai .................... G02B 5/201

FOREIGN PATENT DOCUMENTS

JP         62129815 A  *  6/1987   ............... G02B 3/14
WO       2007040742 A1    12/2007

* cited by examiner

DEVICE COMPRISING A STACK OF INDIVIDUAL LIQUID CRYSTAL CELLS HAVING ELECTRICAL CIRCUITRY OPERABLE TO GENERATE A STACK OF REFRACTIVE INDEX PATTERNS AND METHOD OF PRODUCING THE SAME

CLAIM OF PRIORITY

This application claims priority to Great Britain Patent Application No. 1909161.0, dated Jun. 26, 2019.

FIELD OF THE INVENTION

Liquid crystal material has been used to produce devices whose operating mechanism relies on the generation of a refractive index pattern.

The refractive index of liquid crystal material is sensitive to electric fields. Some practical applications (such as adaptive lenses capable for relatively small focal lengths) require a change in refractive index throughout a relatively large thickness (e.g. 30 microns) of liquid crystal material; and such a change has been achieved by applying voltages across thick layers of liquid crystal material.

The inventor for the present application is working in the field of plastics film processing, and has had the idea of exploiting technology in that technical field to the production of devices whose operating mechanism relies on the generation of a refractive index pattern, particularly adaptive lenses.

There is hereby provided a method, comprising: producing at least first and second individual liquid crystal cells, wherein the first and second individual liquid crystal cells each comprise liquid crystal material between a respective pair of support components, and electrical circuitry operable to generate a refractive index pattern in the liquid crystal material; the method comprising adhering together at least the first and second liquid crystal cells to form a stack of liquid crystal cells; wherein the electrical circuitry of the first and second liquid crystal cells is operable together to generate a stack of refractive index patterns in the liquid crystal material of the stack of liquid crystal cells.

According to one embodiment, the method comprises: producing the first cell by a process comprising pressing first and second half-cells together between first and second carriers temporarily adhered to the first and second half-cells, and thereafter releasing the first cell from the first carrier while keeping the first cell temporarily adhered to the second carrier; producing the second cell by a process comprising pressing third and fourth half-cells together between third and fourth carriers temporarily adhered to the third and fourth half-cells, and thereafter releasing the second cell from the third carrier while keeping the second cell temporarily adhered to the fourth carrier; and thereafter pressing the first and second cells together via the second and fourth carriers.

According to one embodiment, the electrical circuitry of at least first and second liquid crystal cells comprise coincident electrode patterns in the stack of liquid crystal cells, such that a common electrical input generates a stack of coincident refractive index patterns in at least the first and second liquid crystal cells.

According to one embodiment, the electrical circuitry of the first and second liquid crystal cells of the stack of liquid crystal cells comprises substantially matching first and second electrode patterns, wherein a centre axis of the first electrode pattern is aligned with a centre axis of the second electrode pattern, and the first electrode pattern is rotated relative to the second electrode pattern about the centre axis.

According to one embodiment, the support components comprise plastics support film components.

According to one embodiment, the plastics support film component comprises a plastics support film; and wherein the electrical circuitry of the first and second liquid crystal cells is connected in parallel to a common input contact or set of input contacts via holes through the plastics support films.

According to one embodiment, the electrical circuitry comprises a set of concentric conductors.

According to one embodiment, the electrical circuitry further comprises a set of addressing conductors below the set of concentric conductors, wherein each concentric conductor is in contact with a respective one of the addressing conductors through a respective via-hole in one more insulating layers between the set of concentric conductors and the set of addressing conductors.

According to one embodiment, the concentric conductors are connected in series to a common input contact.

According to one embodiment, adjacent concentric conductors are connected in series via one or more relatively low conductance elements, or adjacent concentric conductors are connected in series via one or more variable resistance elements, wherein the resistance of each variable resistance element is controllable via one or more input contacts.

According to one embodiment, the variable resistance elements comprise semiconductor channels capacitively coupled to addressable gate conductors.

According to one embodiment, the concentric conductors comprise a set of elliptical conductors or a set of circular conductors.

According to one embodiment, the electrical circuitry comprises an array of pixel electrodes each independently controllable via a respective addressing conductor.

There is also hereby provided a device, comprising: a stack of at least first and second liquid crystal cells, each of the first and second liquid crystal cells comprising liquid crystal material, and electrical circuitry operable to generate a refractive index pattern in the liquid crystal material; wherein the electrical circuitry of the first and second liquid crystal cells is interconnected such that a common electrical input generates a stack of refractive index patterns in the liquid crystal material of the stack of first and second liquid crystal cells; wherein the electrical circuitry of the first and second liquid crystal cells of the stack of liquid crystal cells comprise substantially matching first and second electrode patterns, wherein a centre axis of the first electrode pattern is aligned with a centre axis of the second electrode pattern, and the first electrode pattern is rotated relative to the second electrode pattern about the centre axis.

There is also hereby provided a device, comprising: a stack of at least first and second liquid crystal cells, each of the first and second liquid crystal cells comprising liquid crystal material, and electrical circuitry operable to generate a refractive index pattern in the liquid crystal material; wherein the electrical circuitry of the first and second liquid crystal cells is interconnected such that a common electrical input generates a stack of refractive index patterns in the liquid crystal material of the stack of first and second liquid crystal cells; device according to any preceding claim, wherein the electrical circuitry comprises a set of concentric conductors.

According to one embodiment, the electrical circuitry further comprises a set of addressing conductors below the set of concentric conductors, wherein each concentric conductor is in contact with a respective one of the addressing conductors through a respective via-hole in one more insulating layers between the set of concentric conductors and the set of addressing conductors.

According to one embodiment, the concentric conductors of a liquid crystal cell are connected in series to a common input contact.

According to one embodiment, adjacent concentric conductors are connected in series via one or more relatively low conductance elements, or are connected in series via one or more variable resistance elements, wherein the resistance of each variable resistance element is controllable via one or more input contacts, or the variable resistance elements comprise semiconductor channels capacitively coupled to addressable gate conductors.

According to one embodiment, the concentric conductors comprise a set of elliptical conductors or a set of circular conductors.

There is also hereby provided a method of producing the device described above, comprising: preparing a first liquid crystal cell, and using the first liquid crystal cell as one half of a second liquid crystal cell to contain liquid crystal material for the second liquid crystal cell between the first liquid crystal cell and a counter component; or preparing first and second liquid crystal cells, and thereafter adhering the first and second liquid crystal cells to each other.

BRIEF DESCRIPTION OF THE FIGURES

Example embodiments of the invention are described in detail hereunder, by way of example only, with reference to the accompanying drawings, in which.

DETAILED DESCRIPTION

A technique according to the present invention is described below in detail for the example of an adaptive lens device, but the technique is equally applicable to other devices that rely on the generation of a refractive index pattern in liquid crystal material.

In one example described further below, the adaptive lens device comprises an array of organic transistor devices (such as organic thin film transistor (OTFT) devices). OTFTs comprise an organic semiconductor (such as e.g. an organic polymer or small-molecule semiconductor) for the semiconductor channels.

Figure 1:
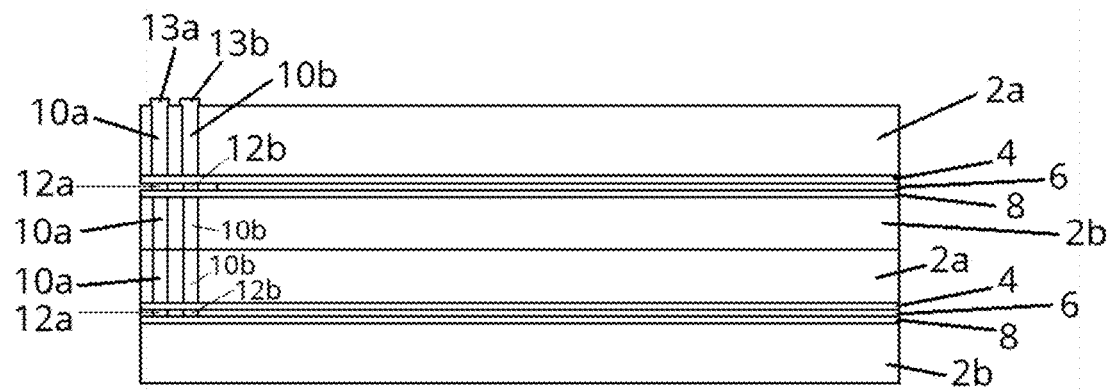
FIG. 1 shows an example of an adaptive lens device comprising a stack of liquid crystal (LC) cells.

With reference to FIG. 1, an example of a device according to an embodiment of the present invention comprises a plurality of LC cells integrated together with circuitry configured to generate an aligned set of identical refractive index patterns in the LC material of each LC cell, from an electrical input common for all LC cells. For simplicity of explanation, FIG. 1 only shows two LC cells, but the structure is equally extendable to devices comprising more LC cells. In this example, the technique of the present invention enables the generation of a refractive index pattern throughout a total combined thickness of LC material using drive voltages that are lower than those used in devices comprising a single LC cell having the same total thickness of LC material. The technique of the present invention also enables switching between different refractive index patterns at faster switching speeds than devices comprising a single LC cell having the same total thickness of LC material. Fast switching lenses are useful to achieve video rates for some applications, such as augmented reality (AR) or virtual reality (VR) headsets. For example, a device comprising a stack of six LC cells each having a cell gap of 5 microns can provide the same focusing action as a device comprising a single cell having a cell gap of 30 microns, but has the advantages of much lower drive voltages and much faster switching speeds.

Each LC cell comprises a thickness (e.g. 5 microns) of nematic LC material 6 contained between two plastics film components. Each plastics film component comprises at least a plastics support film 2a, 2b and electrical circuitry 4, 8 formed in situ on the plastics support films 2a, 2b. LC cells with complex electrical circuitry are already produced by Flexenable Limited using ultra-thin plastics support films (e.g., 40 micron films of cellulose triacetate (TAC)).

Figure 2:
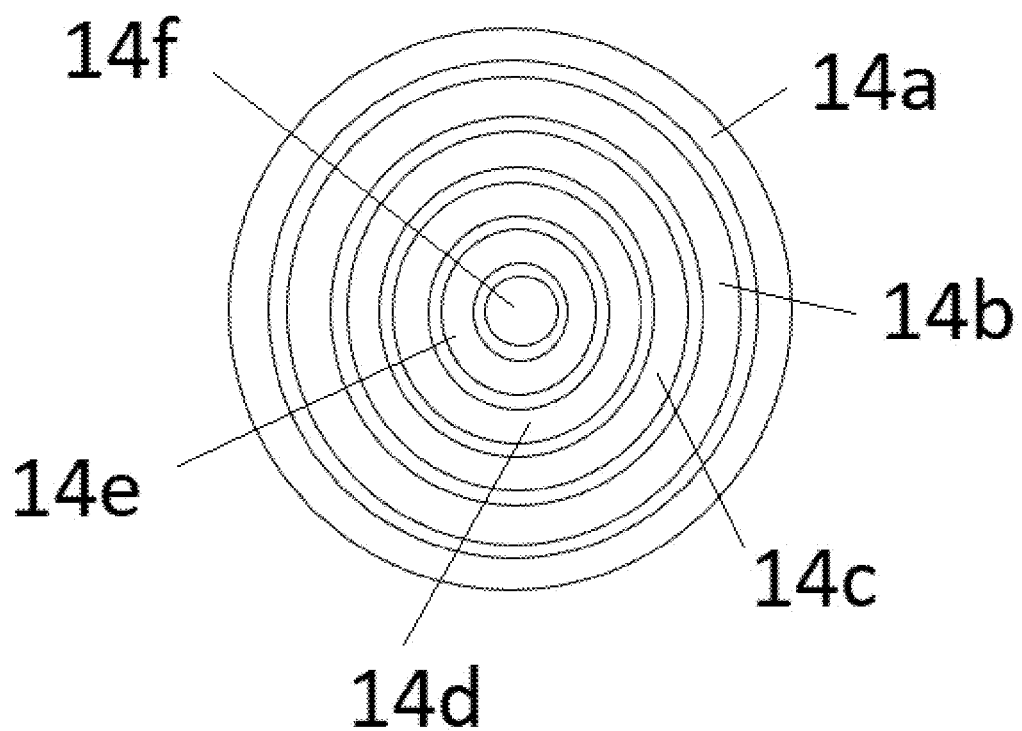
FIG. 2 shows an example of an electrode pattern for each LC cell of the device of FIG. 1.

In this example, all LC cells comprise substantially the same electrode pattern on one side of the LC material 6 and a common counter electrode on the other side of the LC material; and the LC cells are stacked together such that all the electrode patterns are coincident (all electrode patterns have the same orientation and occupy the same area of the device). One example of an electrode pattern is shown in FIG. 2. The electrode pattern comprises a set of concentric conductors 14a-14f. For simplicity of explanation, only 6 concentric conductors are shown in FIG. 2, but the electrode pattern may comprise many more concentric conductors. As mentioned above, in this example, the electrode pattern is the same for all LC cells, and the LC cells are stacked such that all electrode patterns are coincident (each individual concentric conductor (e.g., 14a) of one LC cell occupies the same area of the device as the corresponding individual conductor of all other LC cells).

Figure 3:
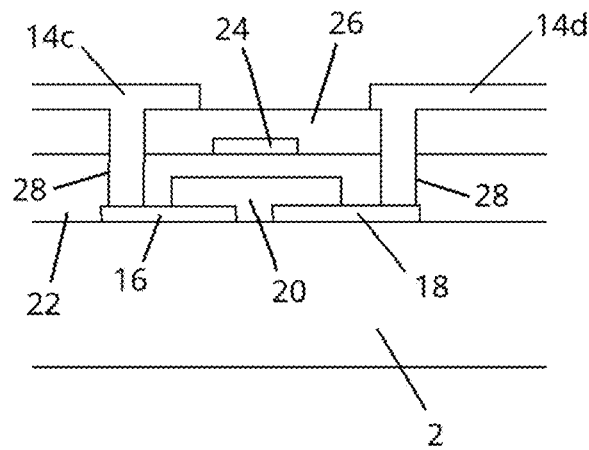
FIG. 3 shows an example of circuitry for connecting the concentric electrodes of FIG. 2 in series via variable resistance elements.
Figure 10:
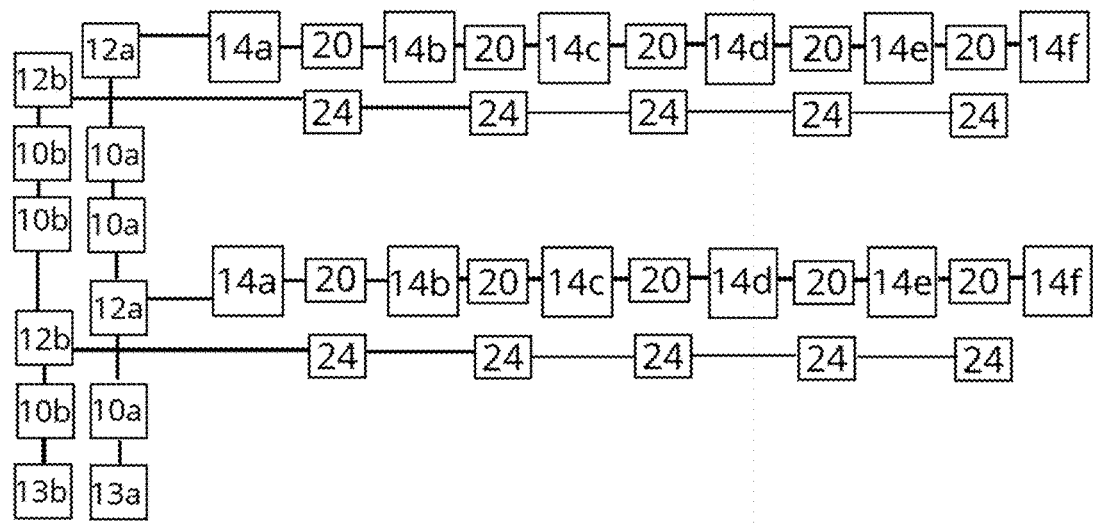
FIG. 10 shows an example of circuitry for connecting the concentric electrodes of FIG. 2 in series via variable resistance elements.

In one example shown in FIGS. 3 and 10, the concentric conductors 14 are connected in series via semiconductor channels 20, whose conductance is variable using a respective gate electrode 24 capacitively coupled to the semiconductor channel 20 via a gate dielectric 22. The relatively low conductance of the semiconductor channels produces a significant potential difference between each pair of adjacent concentric conductors 14, which potential difference produces a corresponding refractive index pattern in the LC material 6. The conductance of the semiconductor channels 20 can be varied by changing the gate voltage at the gate electrodes 24; and a change in the conductance of the semiconductor channels produces a change in the potential difference between each adjacent pair of concentric conductors 14a-14f, thereby producing a change in the refractive index pattern in the LC material 6 of the LC cell. The refractive index pattern of the LC cells can thus be varied by changing the voltage at the gate electrodes via a gate contact outside the area of the concentric conductors 14a-14f.

With reference to FIG. 3, a stack of conductor, semiconductor and insulator layers (wherein the concentric conductor pattern is at the top surface of the stack) is formed in situ on the plastics support film 2 to define this control circuitry. A lower conductor pattern defines pairs of conductor contacts 16, 18; one pair of conductor contacts 16, 18 for each pair of adjacent concentric conductors 14. A patterned semiconductor layer (e.g., organic polymer semiconductor layer) defines semiconductor channels 20 between each pair of conductor contacts 16, 18. An insulator layer defines the gate dielectric 22 via which the gate electrodes are capacitively coupled to the semiconductor channels 20. A middle conductor pattern defines the gate electrodes 24 for each semiconductor channel 20. An insulator layer 26 isolates the middle conductor pattern from the overlying concentric conductors 14a-14f. Each pair of adjacent concentric conductors 14 contacts a respective pair of conductor contacts 16, 18 through via-holes formed in the stack down to the conductor contacts 16, 18.

The lower conductor pattern also defines a pair of addressing lines extending from below the innermost and outermost concentric conductors 14a, 14f to drive contacts outside the area of the concentric conductors 14a-14f. The innermost and outermost concentric conductors 14a, 14f make contact with respective ones of these addressing lines through via-holes formed in the stack. The middle conductor pattern also defines addressing conductors connecting each of the gate electrodes in parallel to a gate contact outside the area of the concentric conductors 14a-14f. The drive contacts and gate contacts of the LC cells are connected in series to respective common input contacts 13a, 13b at the top of the device via conductive links 10a, 10b through the plastics support films 2a, 2b and conductive links 12a, 12b between the electrical circuitry 4, 8 on opposite sides of the LC material 6 in each LC cell. These latter conductive links 12a, 12b may, for example, be of the kind used in some LC display devices to create a conductive connection between the common electrode on one side of the LC cell to electrical circuitry on the other side of the LC cell.

These conductive links 10a, 10b, 12a, 12b between the LC cells enable each set of concentric conductors 14a-14f and each set of gate electrodes to be connected in parallel to common input contacts 13a, 13b. Also, the concentric conductor pattern 14 of each LC cell is aligned with the concentric conductor pattern of all other LC cells. Accordingly, an aligned set of refractive index patterns can be generated in the LC material of the LC cells by a common set of input signals applied to the common input contacts 13a, 13b.

According to one variation, the concentric conductors 14a-14f are connected in series via fixed resistance elements below the concentric conductors 14a-14f. These fixed resistance elements produce a significant fixed potential difference between each pair of adjacent concentric conductors 14, which potential difference produces a refractive index pattern in the LC material 6.

Figure 4:
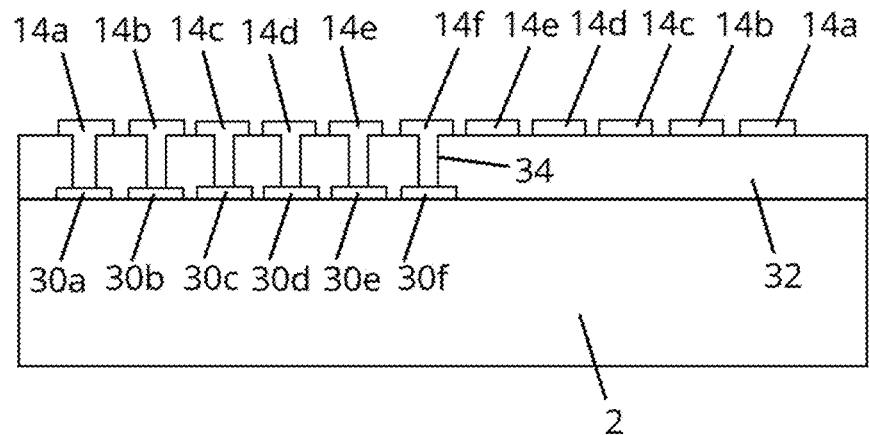
FIG. 4 shows an example of circuitry for addressing each of the concentric electrodes of FIG. 2 in parallel.
Figure 11:
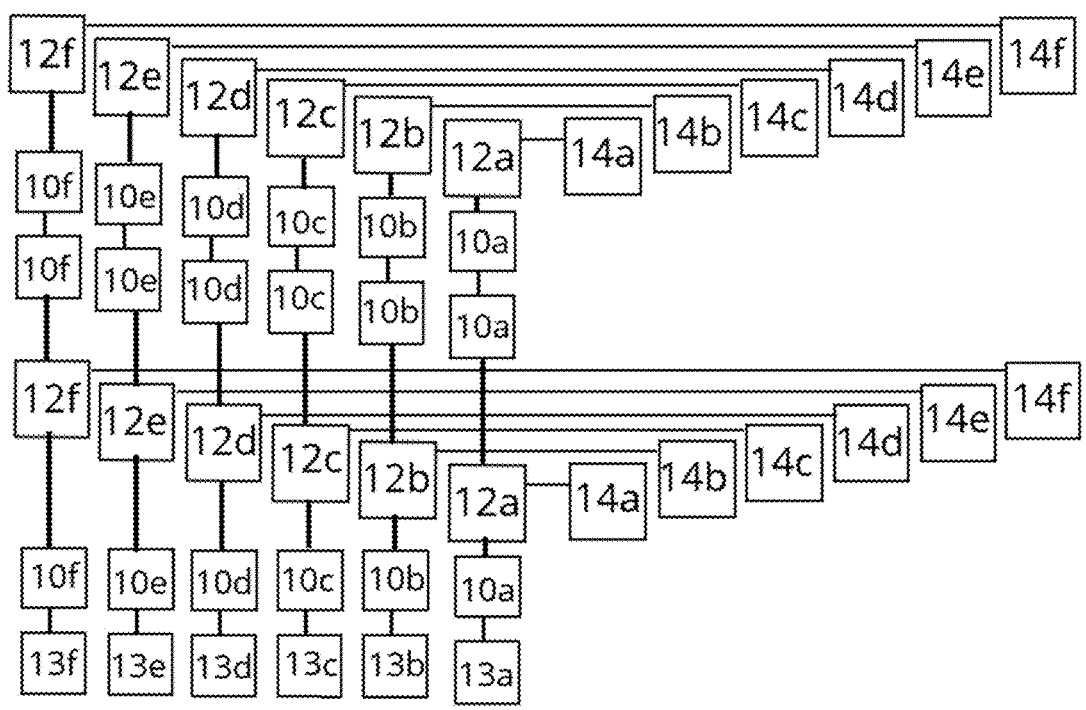
FIG. 11 shows an example of circuitry for addressing each of the concentric electrodes of FIG. 2 in parallel.

In the alternative example shown in FIGS. 4 and 11, each concentric conductor 14 is connected to a respective one of a set of drive contacts outside the area of the concentric conductors 14 via a respective addressing line 30 defined by a lower conductor pattern. The concentric conductors 14 contact the respective addressing lines 30 through via-holes 34 formed in an insulator layer between the upper and lower conductor patterns. Corresponding drive contacts of the LC cells (i.e. drive contacts associated with conductors aligned to each other in the stack of LC cells) are connected in series to a respective common input contact 13a-13f at the top of the device via conductive links 10a-10f through the plastics support films and conductive links 12a-12f between the electrical circuitry 4, 8 on opposite sides of the LC material in each LC cell. These latter conductive links 12a-12f may, for example, be of the kind used in some LC display devices to create a conductive connection between the common electrode on one side of the LC cell to electrical circuitry on the other side of the LC cell.

These conductive links 10a-10f and 12a-12f between the drive contacts of each LC cell enable each corresponding concentric conductor 14a-14f of each LC cell to be connected in parallel to a respective one of the common input contacts 13a-13f. Also, the concentric conductor pattern of each LC cell is aligned with the concentric conductor pattern of all other LC cells. Accordingly, an aligned set of refractive index patterns can be generated in all LC cells by a common set of input signals applied to the common input contacts.

Figure 5:
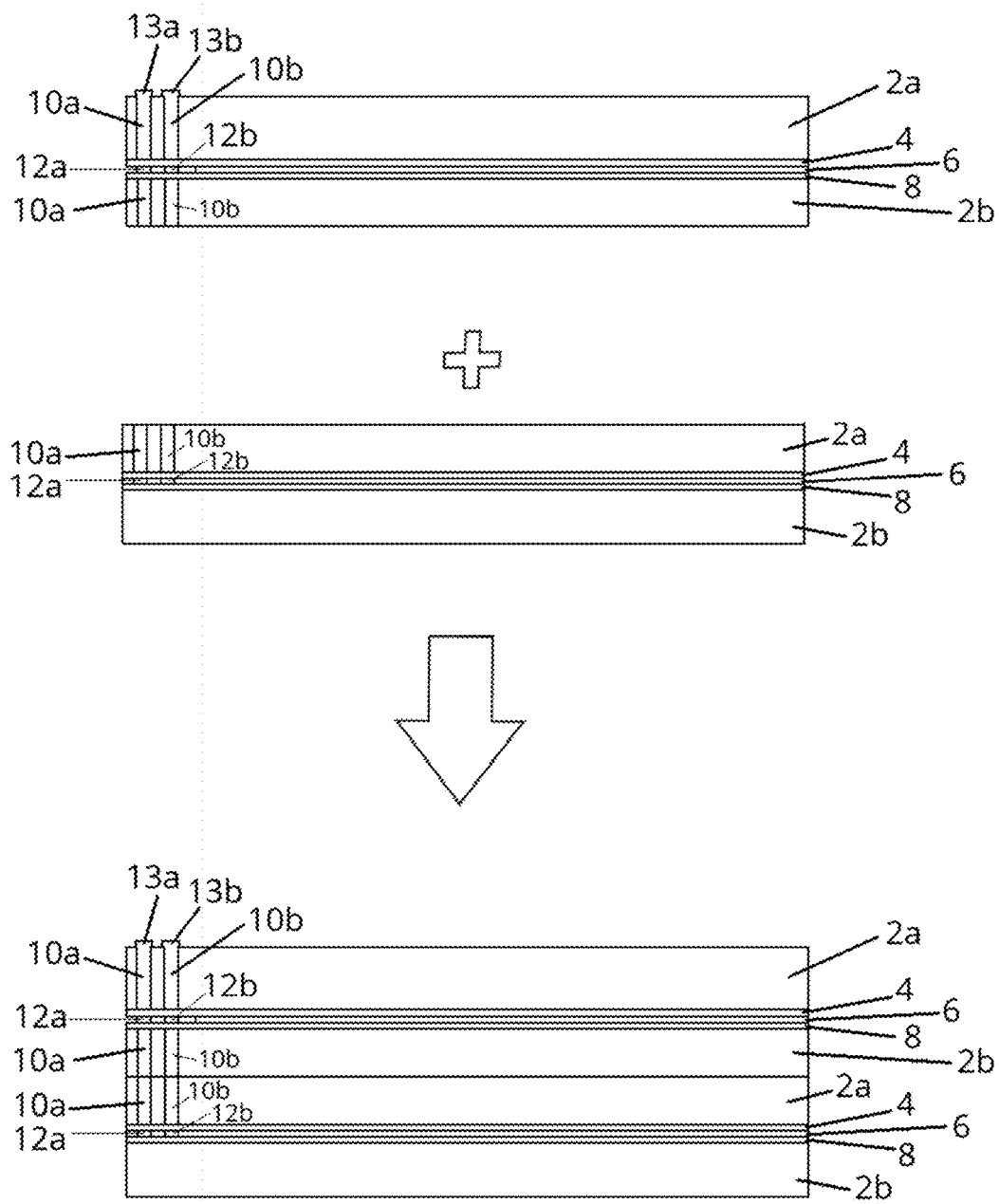
FIG. 5 shows an example of a method of producing the device of FIG. 1.

FIG. 5 illustrates one example of a method for producing the device of FIG. 1. The method comprises preparing each of the individual LC cells (each LC cells comprising a respective pair of plastics support films 2a, 2b), and then adhering the two LC cells together with a conductive connection between the conductive links 10a, 10b of the two LC cells. Each LC cell is prepared by a process comprising adhering the plastics support films 2a, 2b to relatively rigid carriers (e.g. glass carriers) (not shown); forming the electrical circuitry 4, 8 in situ on the plastics support films 2 in situ on the carriers; and thereafter adhering the two half-cells together with the carriers still adhered to the plastics support films 2, by pressing the two half-cells together via an adhesive between the two half-cells, and curing the adhesive under compression. One of the carriers is then released from each completed LC cell while retaining the other of the two carriers adhered to the LC cell. The two LC cells (each now adhered to a respective single carrier) are then adhered together, by pressing the two LC cells together via an adhesive between the two LC cells. After curing this adhesive under compression, and thereafter removing the compression force applied via the carriers, the two remaining carriers are removed. The above-described process involving the mounting and demounting of temporary carriers may use the technique described in WO2017/194672.

Figure 6:
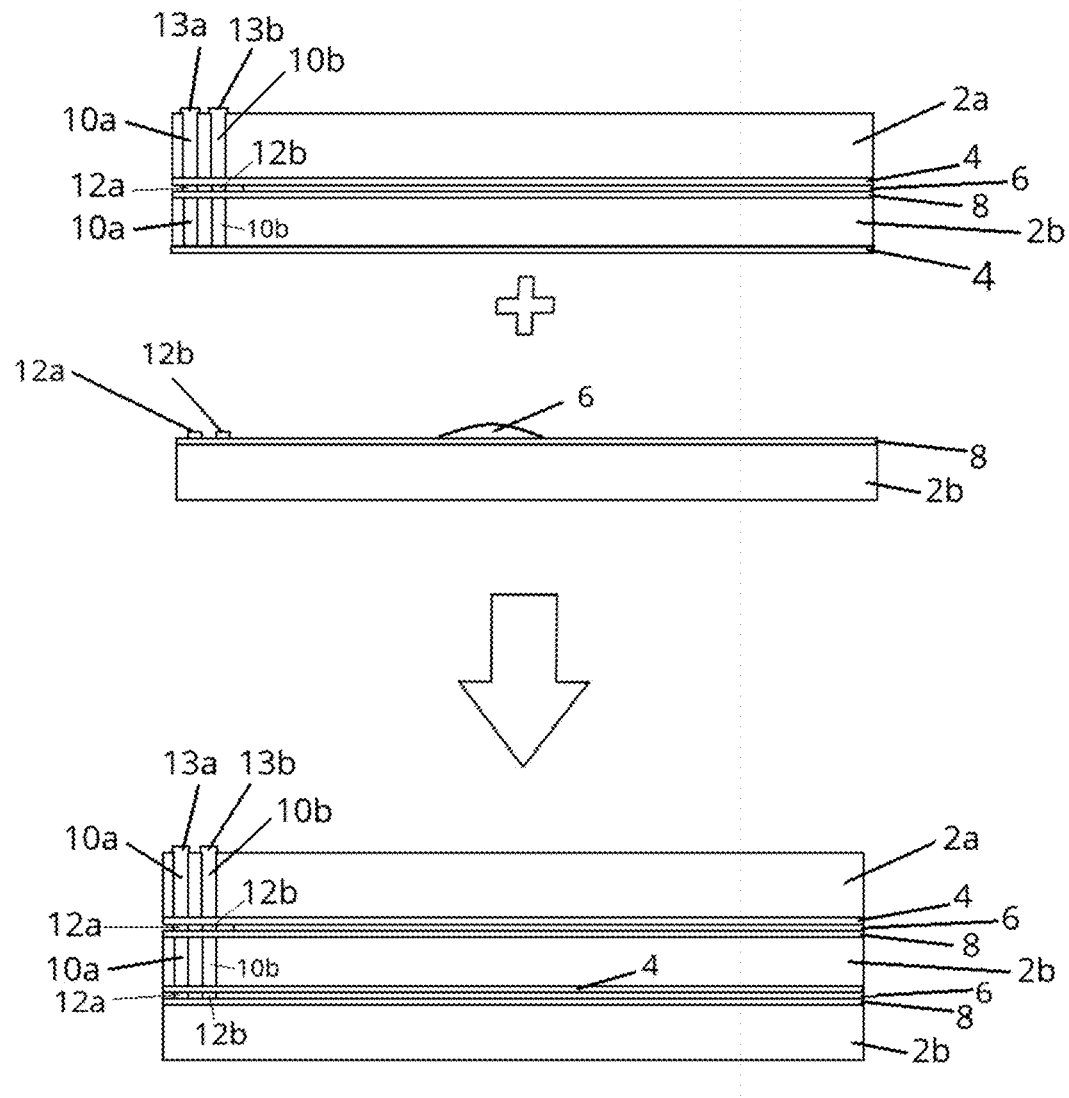
FIG. 6 shows an example of another method of producing the device of FIG. 1.

FIG. 6 illustrates an alternative method for forming the device of FIG. 1. One of the two LC cells is first prepared using the technique described above in relation to FIG. 5, including retaining a carrier on one side of the LC cell. In this alternative example, electrical circuitry 4 for one half of the second LC cell is formed on the underside of one of the plastics support films 2 of the first LC cell, and after completion of the first LC cell, the carrier adjacent to this second LC cell circuitry 4 is removed while retaining the carrier on the other side of the first LC cell. For the second LC cell, a plastics support film 2 is adhered to a carrier (not shown), and the electrical circuitry 8 for the other half of the second LC cell is formed in situ on this plastic support film 2. With the carrier still adhered to this one half of the second LC cell, and with one carrier adhered to the first LC cell, the first LC cell and the half-cell for the second LC cell are pressed together via an adhesive. After curing this adhesive under compression, and thereafter removing the compression force applied via the carriers, the two carriers are removed. The completed device comprises two LC cells sharing a plastics support film 2 between the layers of LC material. Again, the above-described process involving the mounting and demounting of temporary carriers may use the technique described in WO2017/194672.

Figure 7:
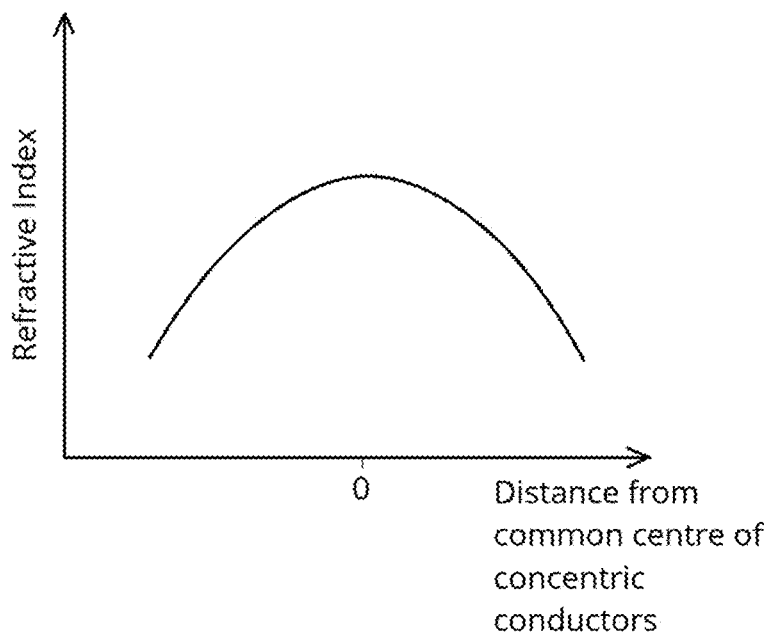
FIG. 7 shows an example of a refractive index pattern for the LC layers of the device of FIG. 1.

FIG. 7 shows an example of one refractive index pattern that may be generated simultaneously in the LC material of all LC cells of the device of FIG. 1. This parabolic refractive index pattern is useful for producing an optical focusing action.

Figure 8:
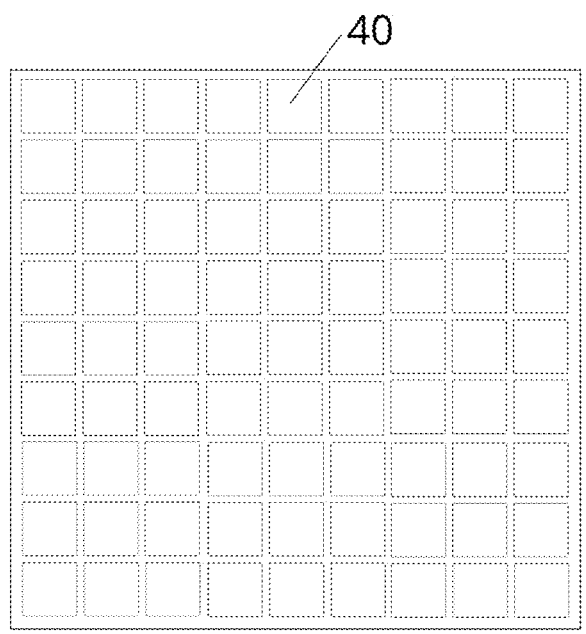
FIG. 8 shows another example of an electrode pattern for each LC cell of the device of FIG. 1.

FIG. 8 shows an alternative electrode pattern for the electrical circuitry 8 of the device of FIG. 1. The alternative electrode pattern comprises a regular x-y array of substantially equally sized and shaped pixel electrodes. FIG. 8 shows a 9×9 array, but the array may comprise larger numbers of pixel electrodes. Each pixel electrode is independently addressable via contacts outside the array of pixel electrodes.

In this alternative example also, the electrode pattern is the same for all LC cells, and the LC cells are stacked such that all electrode patterns are coincident (each individual pixel electrode of one LC cell occupies the same area of the device as the corresponding individual pixel electrode of all other LC cells).

Figure 9:
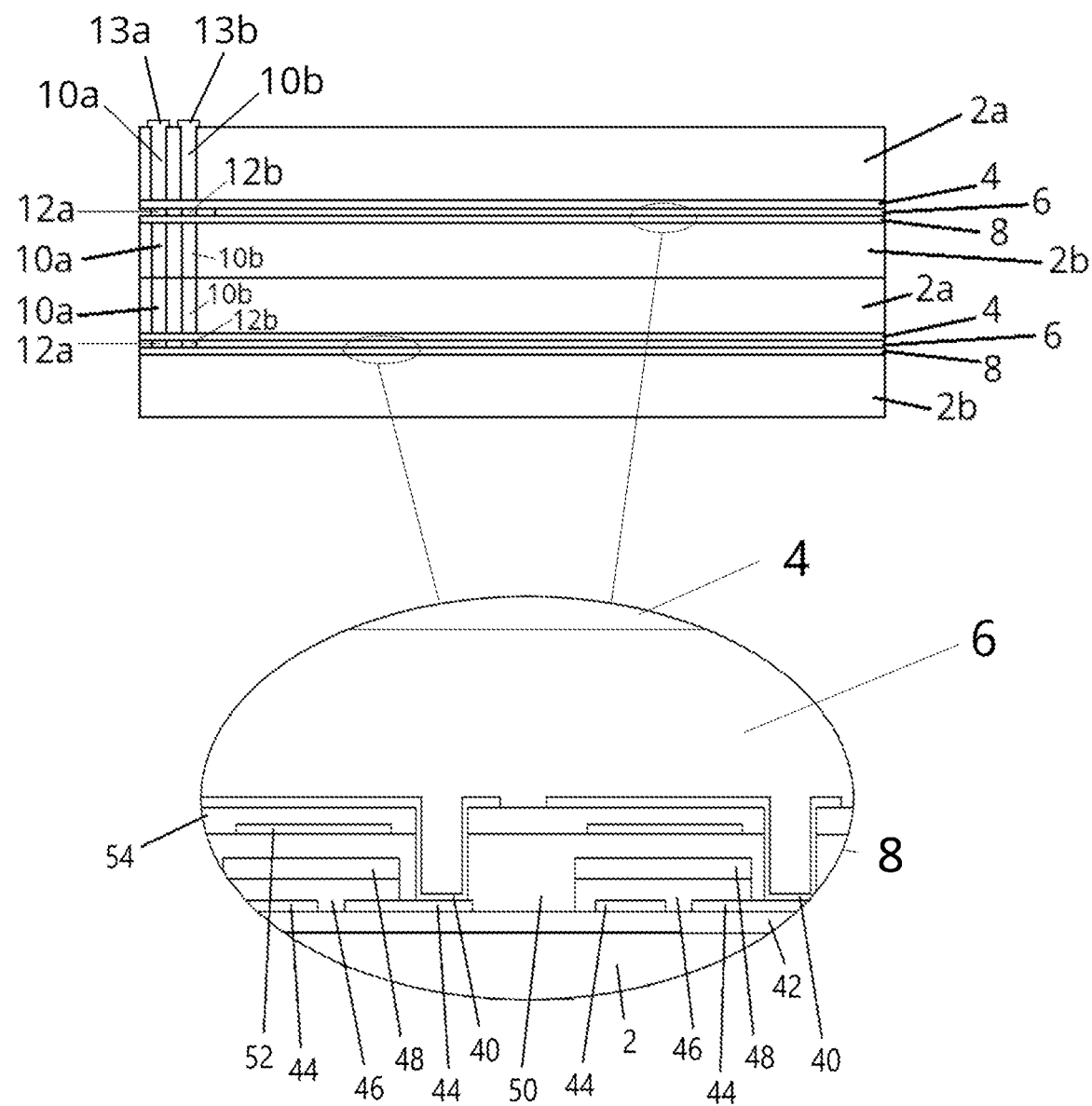
FIG. 9 shows an example of circuitry for independently addressing each electrode of the electrode pattern of FIG. 8.

FIG. 9 shows one example for electrical circuitry for independently addressing the pixel electrodes of FIG. 8. The electrical circuitry includes an active matrix array of thin-film-transistors (TFTs). The active-matrix array comprises: a set of nine source conductor addressing lines, each source conductor addressing line providing the source electrodes for a respective row of transistors and extending to a respective source drive contact outside the array of pixel electrodes; and a set of nine gate conductor addressing lines, each providing the gate electrodes for a respective column of transistors (the terms rows and columns are used here solely to indicate relative directions perpendicular to each other) and extending to a respective gate driver contact outside the array of pixel electrodes. Each pixel electrode 40 is associated with a respectively unique combination of source and gate conductor addressing lines, whereby each pixel electrode is independently addressable via the sets of source and gate driver contacts outside the pixel array. The source driver contacts for corresponding pixel rows in each of the LC cells (i.e., source driver contacts for pixel electrode rows aligned with each other in the stack of LC cells) are connected in series to a respective one of nine common input source driver contacts 13 via the above-mentioned conductive links 10, 12 through and between the plastics support films 2a, 2b. Accordingly, the corresponding source conductor addressing lines of all LC cells are connected in parallel to a respective common source driver input contact 13. Similarly, the gate driver contacts for corresponding pixel columns in each of the LC cells (i.e., gate driver contacts for pixel electrode columns aligned with each other in the stack of LC cells) are connected in series to a respective one of nine common gate driver input contacts 13 via the above-mentioned conductive links 10, 12 through and between the plastics support films 2. Accordingly, the corresponding gate conductor addressing lines of all LC cells are connected in parallel to a respective common gate driver input contact 13. Thus, source and gate driver signals applied to the set of common input contacts (source and gate driver contacts) will simultaneously produce the same pattern of voltages in the pixel electrode arrays of all LC cells, and thereby simultaneously generate an aligned set of substantially identical refractive index patterns in all the LC cells. This example of electrical circuitry can produce different kinds of complex refractive index patterns, such as refractive index patterns that are suited to compensating for astigmatism in the human eye.

With reference to FIG. 9, the active matrix array described above is defined in this example by a stack of conductor, semiconductor and insulator layers formed in situ on a plastics support film 2 of the LC cell. The array of pixel electrodes 40 are at the top of the stack. A lower conductor pattern (formed on the plastics support film 2 via a hard coating planarisation layer 42) defines the above-mentioned source conductor addressing lines 44, and also defines an array of drain conductors 44 each associated with a respective pixel electrode. A patterned stack of organic semiconductor and organic polymer dielectric layers 46, 48 provides isolated semiconductor channels for each transistor. A layer 50 of organic polymer dielectric material (exhibiting a higher dielectric constant (k) than the underlying dielectric layer 48) provides additional gate dielectric for the transistors. A middle conductor pattern defines the above-mentioned gate conductor addressing lines 52, each providing the gate electrodes for a respective column of transistors. One or more layers of organic polymer insulating material 54 isolate the middle conductor pattern from the upper conductor pattern defining the array of pixel electrodes 40. Each pixel electrode 40 makes contact with a respective drain conductor 44 through a respective via-hole formed down through the stack to the lower conductor pattern.

Figure 12:
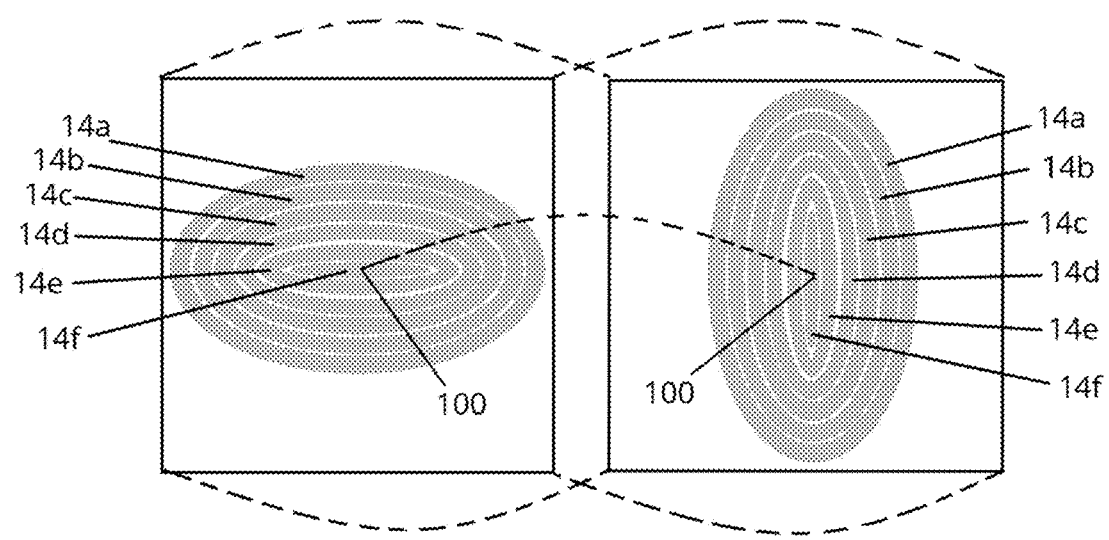
FIG. 12 shows an example of varying the orientation of the electrode pattern between LC cells.

FIG. 12 shows a different example, in which the electrode pattern is the same for all LC cells, but the LC cells are stacked such that the electrode pattern does not have the same orientation in all LC cells. In the example of FIG. 12, at least two LC cells comprise the same electrode pattern comprising a concentric set of elliptical conductors 14a-14f, but the LC cells are stacked such that the electrode patterns are orientated differently between the two LC cells. In FIG. 12, the dashed lines show how the two LC cells are aligned to each other. In the example shown in FIG. 12, one electrode pattern is orientated at substantially 90 degrees to the other electrode pattern, with alignment of the axes 100 of the two electrode patterns. The electrical circuitry for controlling these two electrode patterns may be the same as for the examples described above (in which each LC cell comprises an electrode pattern including a set of concentric circular conductors 14a-14f). The stack of LC cells may, for example, additionally include (i) one or more further LC cells having the same elliptical electrode pattern aligned concentrically at the same or different orientation, and/or (ii) one or more further LC cells having a circular electrode pattern (of the kind shown in FIG. 2) aligned concentrically with the elliptical electrode patterns.

Figure 13:
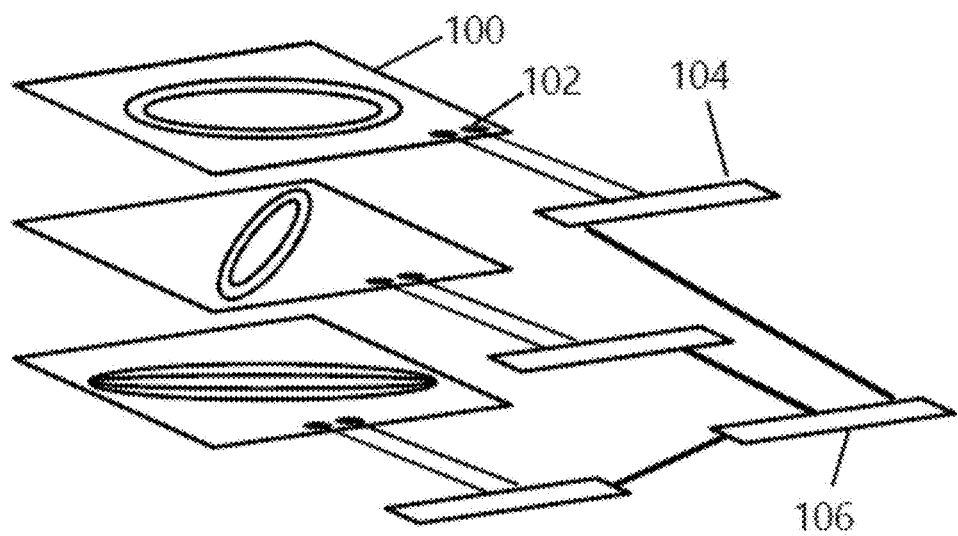
FIGS. 13-15 show examples of different ways of co-operating the LC cells of the stack via a common electrical input.
Figure 14:
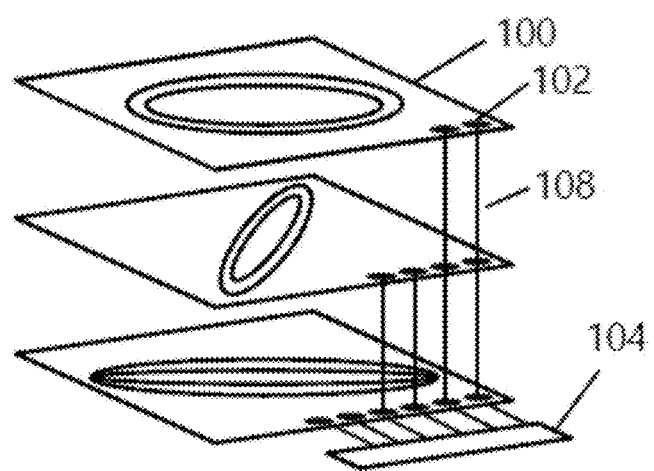
Figure 15:
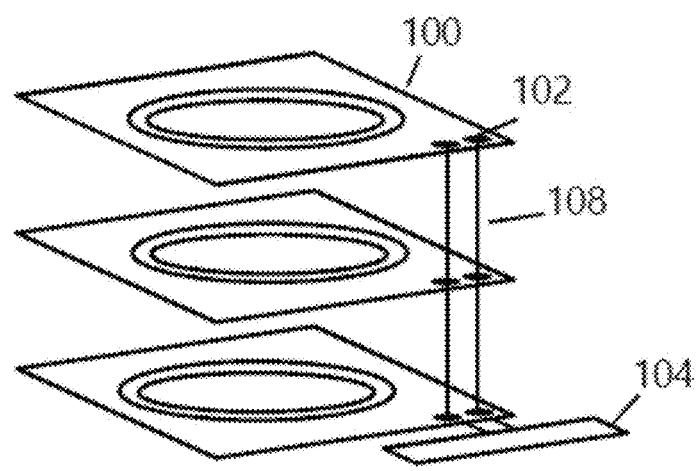

FIGS. 13-15 show examples of different options for operating the plurality of LC cells 100 in the stack of LC cells 100 via a common electrical input. The LC cells 100 are shown separately in FIGS. 13-15 to facilitate illustration of the electrical connections between LC cells 100, but the LC cells 100 are adhered together in a stack, as described above.

In FIG. 13, the electrode pattern and common counter electrode of each LC cell 100 are connected to terminals of a respective driver chip 104 ((integrated circuit) via terminals 102 on one or more of the two support films forming the LC cell 100. The driver chip 104 for each LC cell 100 may, for example, be mounted on one of the support films forming part of the respective LC cell 100. The driver chips 104 are connected to a common processor 106 via which the LC cells 100 are co-operable. The LC cells 100 are independently controllable through the use of respective driver chips 104 for each LC cell 100. This option allows each LC cell 100 in the stack to be switched into use or bypassed, and is particularly suited, for example, to a stack of LC cells 100 having different electrode patterns for producing different refractive index patterns (as schematically shown in FIG. 13).

In FIG. 14, the electrode pattern and common counter electrode of each LC cell 100 is connected to respective chip terminals of a single, common driver chip 104 via terminals 102 on one or more of the support films forming part of the respective LC cell 100, and conductive connections 108 between the terminals 102 of adjacent LC cells 100. The single driver chip 104 may, for example, be mounted on one of the support films forming one of the LC cells 100. The LC cells 100 are independently controllable through the use of respective driver chip terminals for each LC cell 100. This option also allows each LC cell 100 in the stack to be switched into use or bypassed, and is particularly suited, for example, to a stack of LC cells 100 having different electrode patterns for producing different refractive index patterns (as schematically shown in FIG. 14).

In FIG. 15, the electrode pattern and common counter electrode of all LC cells 100 in the stack are commonly connected to the same chip terminals of a single, common driver chip 104 via terminals 102 on one or more of the support films forming part of the respective LC cell 100, and conductive connections 108 between the terminals 102 of adjacent LC cells 100. The single driver chip 104 may, for example, be mounted on one of the support films forming one of the LC cells 100. This option is particularly suited, for example, to a stack of LC cells each having the same electrode pattern for forming the same refractive index pattern.

Examples of techniques according to the present invention have been described in detail above with reference to specific process details and device features, but the technique is more widely applicable within the general teaching of the present application. Additionally, and in accordance with the general teaching of the present invention, a technique according to the present invention may include additional process steps/device features not described above, and/or omit some of the process steps/device features described above.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

What is claimed is:

1. A method, comprising: producing at least first and second individual liquid crystal cells, wherein the first and second individual liquid crystal cells each comprise liquid crystal material between a respective pair of support components, and electrical circuitry operable to generate a refractive index pattern in the liquid crystal material; the method comprising adhering together at least the first and second liquid crystal cells to form a stack of liquid crystal cells; wherein the electrical circuitry of the first and second liquid crystal cells is operable together to generate a stack of refractive index patterns in the liquid crystal material of the stack of liquid crystal cells;

wherein the method comprises: producing the first cell by a process comprising pressing first and second half-cells together between first and second carriers temporarily adhered to the first and second half-cells, and thereafter releasing the first cell from the first carrier while keeping the first cell temporarily adhered to the second carrier; producing the second cell by a process comprising pressing third and fourth half-cells together between third and fourth carriers temporarily adhered to the third and fourth half-cells, and thereafter releasing the second cell from the third carrier while keeping the second cell temporarily adhered to the fourth carrier; and thereafter pressing the first and second cells together via the second and fourth carriers.

2. The method according to claim 1, wherein the electrical circuitry of at least first and second liquid crystal cells comprise coincident electrode patterns in the stack of liquid crystal cells, such that a common electrical input generates a stack of coincident refractive index patterns in at least the first and second liquid crystal cells.

3. The method according to claim 1, wherein the electrical circuitry of the first and second liquid crystal cells of the stack of liquid crystal cells comprises substantially matching first and second electrode patterns, wherein a centre axis of the first electrode pattern is aligned with a centre axis of the second electrode pattern, and the first electrode pattern is rotated relative to the second electrode pattern about the centre axis.

4. The method according to claim 1, wherein the support components comprise plastics support film components.

5. The method according to claim 4, wherein the plastics support film component comprises a plastics support film; and wherein the electrical circuitry of the first and second liquid crystal cells is connected in parallel to a common input contact or set of input contacts via holes through the plastics support films.

6. The method according to claim 1, wherein the electrical circuitry comprises a set of concentric conductors.

7. The method according to claim 6, wherein the electrical circuitry further comprises a set of addressing conductors below the set of concentric conductors, wherein each concentric conductor is in contact with a respective one of the addressing conductors through a respective via-hole in one more insulating layers between the set of concentric conductors and the set of addressing conductors.

8. The method according to claim 6, wherein the concentric conductors are connected in series to a common input contact.

9. The method according to claim 8, wherein adjacent concentric conductors are connected in series via one or more relatively low conductance elements, or adjacent concentric conductors are connected in series via one or more variable resistance elements, wherein the resistance of each variable resistance element is controllable via one or more input contacts.

10. The method according to claim 9, wherein the variable resistance elements comprise semiconductor channels capacitively coupled to addressable gate conductors.

11. The method according to claim 6, wherein the concentric conductors comprise a set of elliptical conductors or a set of circular conductors.

12. The method according to claim 1, wherein the electrical circuitry comprises an array of pixel electrodes each independently controllable via a respective addressing conductor.

13. A device, comprising: a stack of at least first and second liquid crystal cells, each of the first and second liquid crystal cells comprising liquid crystal material, and electrical circuitry operable to generate a refractive index pattern in the liquid crystal material; wherein the electrical circuitry of the first and second liquid crystal cells is interconnected such that a common electrical input generates a stack of refractive index patterns in the liquid crystal material of the stack of first and second liquid crystal cells; wherein the electrical circuitry comprises a set of concentric conductors;
wherein the concentric conductors of a liquid crystal cell are connected in series to a common input contact.

14. The device according to claim 13, wherein adjacent concentric conductors are connected in series via one or more relatively low conductance elements, or are connected in series via one or more variable resistance elements, wherein the resistance of each variable resistance element is controllable via one or more input contacts, or the variable resistance elements comprise semiconductor channels capacitively coupled to addressable gate conductors.

15. The device according to claim 13, wherein the concentric conductors comprise a set of elliptical conductors or a set of circular conductors.

16. A method comprising:
producing at least first and second individual liquid crystal cells, wherein the first and second individual liquid crystal cells each comprise liquid crystal material between a respective pair of support components, and electrical circuitry operable to generate a refractive index pattern in the liquid crystal material; and
adhering together at least the first and second liquid crystal cells to form a stack of liquid crystal cells,
wherein the electrical circuitry of the first and second liquid crystal cells comprises a set of concentric conductors connected in series to a common input contact, the electrical circuitry being operable together to generate a stack of refractive index patterns in the liquid crystal material of the stack of liquid crystal cells.

17. The method according to claim 16, wherein adjacent concentric conductors are connected in series via one or more relatively low conductance elements, or adjacent concentric conductors are connected in series via one or more variable resistance elements, wherein the resistance of each variable resistance element is controllable via one or more input contacts.

18. The method according to claim 17, wherein the variable resistance elements comprise semiconductor channels capacitively coupled to addressable gate conductors.

19. The method according to claim 16, wherein the concentric conductors comprise a set of elliptical conductors or a set of circular conductors.

* * * * *